United States Patent

[11] 3,628,634

[72] Inventor  Jonas Valukonis
              Detroit, Mich.
[21] Appl. No. 59,485
[22] Filed     July 30, 1970
[45] Patented  Dec. 21, 1971
[73] Assignee  Ford Motor Company
              Dearborn, Mich.
              Continuation of application Ser. No.
              823,458, May 9, 1969, now abandoned.
              This application July 30, 1970, Ser. No.
              59,485

[54] FINNED ENERGY ABSORBER
     13 Claims, 10 Drawing Figs.
[52] U.S. Cl. .................................................. 188/1 C,
                                                    74/492, 293/70
[51] Int. Cl. .................................................. F16f 7/12
[50] Field of Search ........................................ 188/1 C;
                                                    74/492; 293/70

[56]              References Cited
              UNITED STATES PATENTS
2,776,695   1/1957   Wells .............................. 188/1 C X
3,394,612   7/1968   Bogosoff et al. ................. 188/1 C X
3,412,828   11/1968  Daniels ........................... 177/1 C X
3,482,653   12/1969  Maki et al. ...................... 188/1 C
              FOREIGN PATENTS
1,105,404   6/1955   France ............................. 188/1 C Primary Examiner—Duane A. Reger
Attorneys—John R. Faulkner and William E. Johnson ABSTRACT: A finned energy absorbing device includes a stationary member, a movable member, a deformable fin secured to one of the members and a fin-deforming member secured to the other of the members. The deformable fin and the fin-deforming member are so dimensioned with respect to one another that when they are secured to their associated members, the fin-deforming member interferes with the passage of the fin therepast when the movable member is moved with respect to the stationary member. In one embodiment, the finned energy-absorbing device includes an elongate cylindrical member having a plurality of equally spaced fins lying along the length of the member and projecting radially therefrom. Corresponding to each of the fins is one of a plurality of arcuate deforming members positioned such that movement of the elongate member along its longitudinal axis will result in each of the fins being engaged by one of the deforming members. This engagement results in a combination bending and shearing of the fins whereby energy is absorbed.

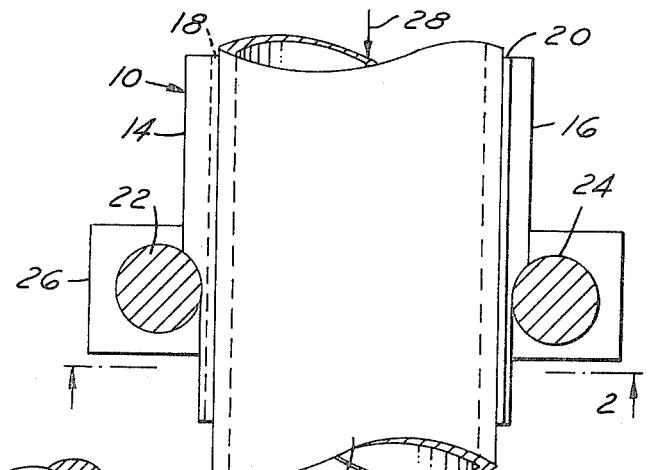
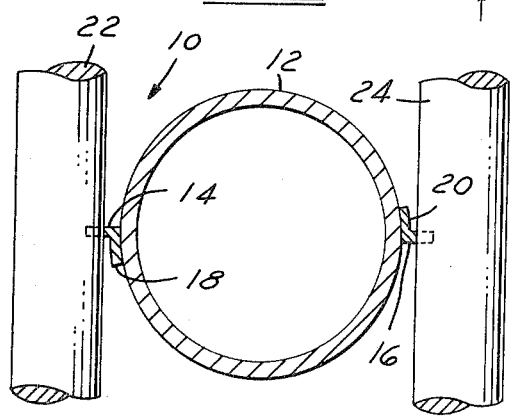
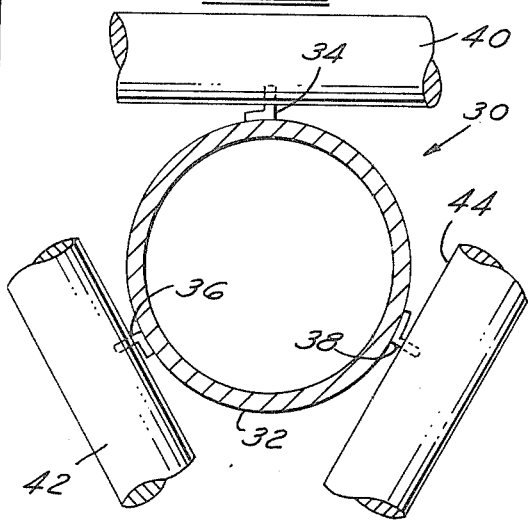
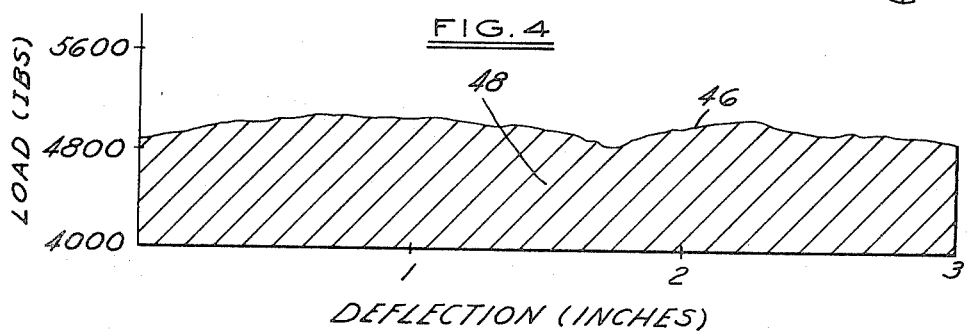

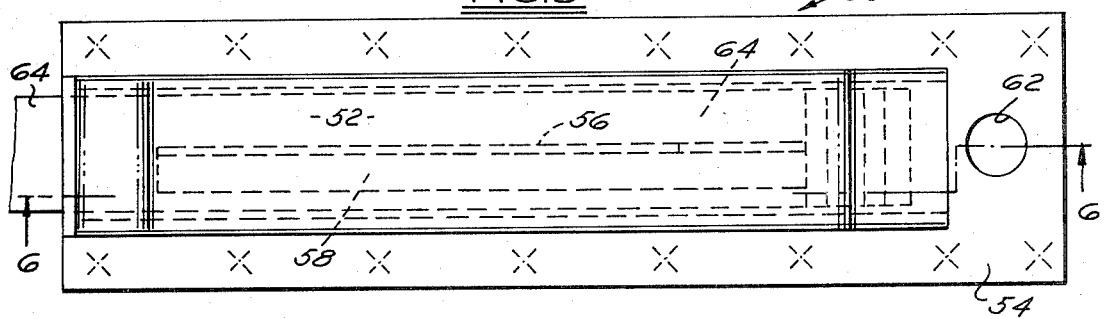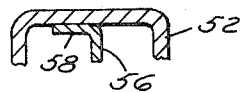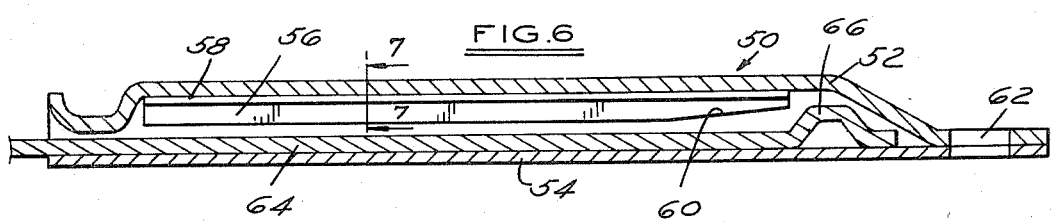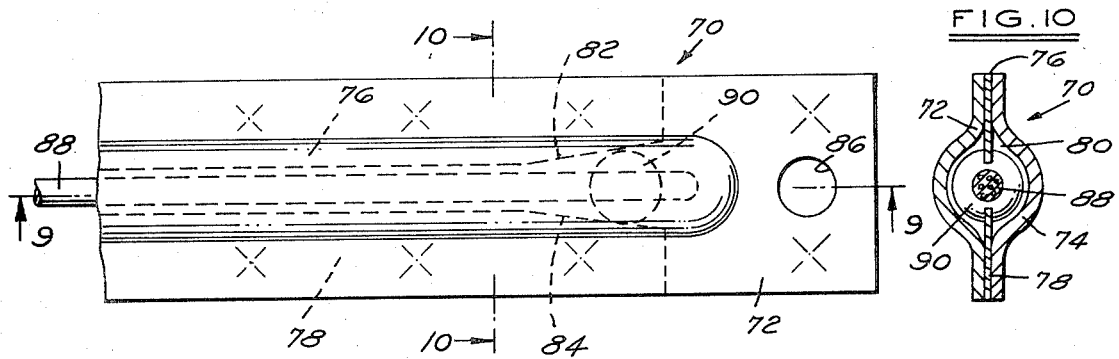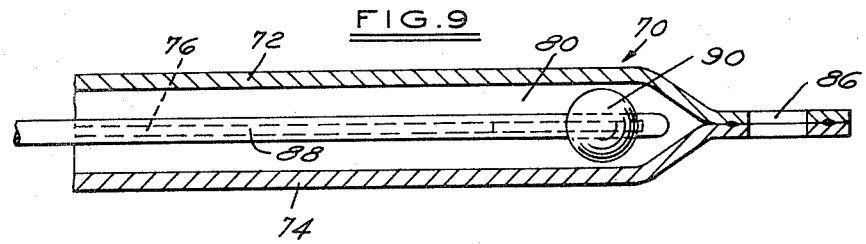

FINNED ENERGY ABSORBER

This application is a continuation in part of my application Ser. No. 823,458, filed May 9, 1969 now abandoned.

BACKGROUND OF THE INVENTION

Various energy-absorbing devices known in the art absorb energy by directing a force to accomplish work. This work often has taken the form of metal deformation such as bending, shearing and nonelastic plastic deformation as occurs during extrusion and drawing. It readily may be appreciated that to accomplish work in this manner, a relative movement must occur between a workpiece and structure causing deformation of this workpiece.

The length of this relative movement, that is, the distance moved during workpiece deformation (deflection), is a variable affecting the magnitude of energy absorbed. In many applications of energy absorbers, design parameters dictate that this deflection be quite short while the potential for energy absorption must be large. Maximum energy is absorbed over a given deflection when the load on the workpiece remains constant.

It is an object of this invention to provide an energy-absorbing device that absorbs energy through metal deformation and where a maximized magnitude of energy is absorbed for a given deflection. This is accomplished by providing that the load causing this deflection remains substantially constant. Furthermore, the energy absorber of this invention may be constructed simply and economically because of simplicity of design and the noncriticality of the dimensions of the parts thereof.

SUMMARY OF THE INVENTION

An energy-absorbing device constructed in accordance with this invention includes a stationary member, a movable member, a deformable fin secured to one of the members and a fin-deforming member secured to the other of the members. The deformable fin and the fin-deforming member are so dimensioned with respect to one another when secured to their associated members that the fin-deforming member interferes with the passage of the fin therepast when the movable member is moved with respect to the stationary member.

An energy-absorbing device constructed in accordance with one embodiment of this invention includes an elongate member having a circular cross section. A plurality of fins extend radially from the elongate member. The fins lie parallel to the axis of the elongate member and are spaced equally about the circumference of the elongate member. Plural fin-deforming means are positioned adjacent the elongate member and are spaced such that each one of the fins will be engaged and deformed by one of the fin-deforming means upon longitudinal movement of the elongate member. The deformation of the fins is a combination of bending and shearing and provides for a substantially constant load upon the elongate member. The fin-deforming means comprise elongate deforming members having circular cross sections with the longitudinal axis of each one of the deforming members being perpendicular to a radius of the elongate member extending to said one deforming member. The fins comprise one leg of an L-shaped member. The other leg of the L-shaped member is positioned on the surface of the elongate member and is secured thereto.

DESCRIPTION OF THE DRAWINGS

FIG. 1 is a plan view, partially in section, of an energy-absorbing device constructed in accordance with this invention.

FIG. 2 is a partial sectional view taken along the line 2—2 of FIG. 1.

FIG. 3 is a view similar to FIG. 2 but showing a modified embodiment of this invention.

FIG. 4 is a load-deflection curve for the energy absorber of FIGS. 1 and 2.

FIG. 5 is a plan view of another modified embodiment of this invention.

FIG. 6 is a partial sectional view taken along line 6—6 of FIG. 5.

FIG. 7 is a partial sectional view taken along line 7—7 of FIG. 6.

FIG. 8 is a plan view showing still another modified embodiment of this invention.

FIG. 9 is a partial sectional view taken along the line 9—9 of FIG. 8.

FIG. 10 is a cross sectional view taken along line 10—10 of FIG. 8.

DESCRIPTION OF THE INVENTION

Referring now in detail to the drawings and in particular to FIGS. 1 and 2 thereof, the numeral 10 denotes generally one embodiment of an energy-absorbing device constructed in accordance with this invention. This device includes an elongate member comprising a tube 12 constructed of material having great structural strength characteristics and resistance to deformation such as carbon steel. A pair of fins 14 and 16 extend radially from tube 12. It may be seen that fins 14 and 16 each comprise one leg of L-shaped members having second legs 18 and 20 that are secured, as by welding, to the outer surface of tube 12. As best may be appreciated from FIG. 2, fins 14 and 16 are spaced equidistantly about the periphery of tube 12 and are positioned such that they lie parallel to the longitudinal axis of the tube.

A pair of fin-deforming posts 22 and 24 are secured against movement in a base member 26. These posts have circular cross sections as may be seen from FIG. 1 and are spaced apart a distance such that the passage of tube 12 between these posts will result in an interference between the posts and fins 14 and 16 as illustrated.

When a sufficient force represented by the arrow 28, is applied to tube 12 to cause longitudinal movement of the tube, this interference will result in a deformation of fins 14 and 16. It has been found that this deformation of the fins is a combination of bending and shearing. The significance of this deformation will be explained in greater detail below.

As the deflection of tube 12 occurs with an accompanying deformation of fins 14 and 16, the equally spaced positioning of the fins results in a balanced lateral force condition on tube 12. Thus no resultant lateral force on the tube is present to cause misalignment of the tube relative to posts 22 and 24.

FIG. 3 illustrates a second embodiment of energy-absorbing device constructed in accordance with this invention and identified by the reference numeral 30. This embodiment of energy-absorbing device also includes an elongate tube 32 but includes three radially extending fins 34, 36 and 38 projecting from tube 32. Fins 34, 36 and 38 are equally spaced (at 120° intervals) about the circumference of tube 32. As with the embodiment in the invention illustrated in FIGS. 1 and 2, each of the fins will be engaged by a fin deforming post upon longitudinal movement of tube 32. These posts are identified by the reference numerals 40, 42 and 44. During deformation of the fins of energy absorber 30, the equally spaced orientation of these fins results in a lateral resultant force of zero so that there is no tendency of tube 32 to shift laterally.

It readily may be appreciated that any number of fins may be attached to the tube of an energy absorbing device of this invention. Greater numbers of fins will result in a greater potential for energy absorption. Regardless of the number of tubes utilized, the fins should be spaced equally about the circumference of the elongate tube so that there will be no resultant lateral force during fin deformation.

It readily may be appreciated that the energy-absorbing device of this invention easily and economically may be constructed. The tube itself may be readily available commercial tubing to which the desired number of L-shaped members are attached with one arm of these members comprising the fin to be deformed. The relative sizes and strengths of the tube and fins need only be such that fin deformation will occur without a deformation of the tube. It has been found that dimension control of the interference between the fins and the fin-deforming posts is not critical. Tests have proven that dimensional variances of plus or minus 0.030 inch in this interference have a negligible effect on the amount of energy absorbed.

The energy-absorbing device of this invention maximizes the amount of energy absorbed for a given deflection of the elongate tube. This maximization of energy absorbed is due to the almost constant load on tube 12 during deflection of the tube and fin deformation. This may be appreciated by reference to FIG. 4 of the drawing that comprises the graph of a load-deflection curve for an energy-absorbing device similar to that illustrated in FIGS. 1 and 2 and wherein the abscissa is the deflection of the tube 12 in inches and the ordinate is the load upon the tube in pounds.

The curve 46 resulted from the test of an energy-absorbing device having two fins formed of low carbon steel and having an L-shape and a gauge thickness of 0.095 inch. The interference between the fins and the fin deforming post was 0.08 inch and the deflection velocity of the tube was 2 inches per minute. It readily may be appreciated that curve 46 indicates that a relatively constant load, having a means value of about 5,000 lbs., was on the tube of the energy-absorbing device tested. The shaded area 48 beneath curve 46 represents the energy absorbed by the fin deformation. It may be seen that this shaded area 48 approaches the maximum energy absorption that may be accomplished for the three inch deflection. The maximum energy absorbed, of course, would result if curve 46 was a straight line and area 48 a perfect rectangle.

It is believed that the relatively constant value of curve 46 is attained due to the combination of two types of deformation that occur during deflection of the tube of the energy absorber of this invention. Both shearing and bending have been found to occur when the fins are deformed by arcuate tube deforming means such as the posts described above.

In FIG. 5 there is shown a third embodiment of the energy-absorbing device of this invention and it is generally identified by the numeral 50. The device includes a housing formed from an upper housing member 52 and a lower housing member 54. The upper and lower members may be formed of sheet metal and may be secured together by spot welding.

A fin 56 has a second leg 58 which is secured to the upper housing member 52. The fin extends for its length along the volume defined in the interior of the housing. As viewed in FIG. 6, the right end of the fin 56 is tapered at 60. The housing members have an opening 62 formed therein so that a fastener may be placed therethrough to secure the device to a structure such as a motor vehicle.

A movable member 64, which may be attached to an article such as a vehicle seat belt, is formed so that the right end thereof has an upstanding projection 66 formed thereon. This projection is formed from material harder than the material which forms the fin 56 so that it will deform the fin upon engagement.

When a sufficient force is placed on the movable member 64 to draw its projection 66 along the interior volume of the housing, the projection engages the fin 56 and deforms the same. The deformation of the fin by the projection functions to dissipate energy in the manner previously described.

Reference is now made to FIG. 8 wherein a fourth embodiment of the device of this invention is shown and it is generally identified by the numeral 70. In this embodiment two similar housing members 72 and 74 are employed. The two members are secured together by spot welding and they support therebetween two deformable fins 76 and 78. The fins extend into a generally circular cross-sectional volume defined between the housing members. The fins 80 are tapered at their rightmost ends as depicted at numerals 82 and 84 in FIG. 8. An opening 86 is provided in the two housing members so that the structure may be attached to a stationary device such as the frame of a motor vehicle.

A movable member 88 extends into the circular volume 80 of the device 70 and is terminated at its right end by a spherical member 90. As is best seen in FIG. 8, the spherical member is located between the fins 76 and 78 and is movable therebetween when sufficient pressure is applied to the movable member 88.

Thus, in accordance with the principles and teachings of this invention, the fourth embodiment device 70 is effective to absorb energy when the movable member 88 is moved relative to the two housing members 72 and 74. The energy is absorbed when the spherical member 90 is pulled along between the fins 76 and 78 whereby the fins are deformed. The deformation of the fins is, of course, the action which takes up the energy.

It thus may be seen that this invention provides an energy-absorbing device that may be easily and economically constructed of readily available materials and that yields a maximum energy absorption for a given deflection distance. Lateral forces, tending to cause misalignment of the energy-absorbing device parts during deformation, have been eliminated due to the symmetrical construction of the device of this invention.

I claim:

1. An energy-absorbing device comprising: an elongate member having a configuration that is symmetrical about a longitudinal axis, a plurality of fins extending laterally from said elongate member and extending along and being arranged symmetrically about said axis, fin-deforming means defining an opening therebetween, through which said elongate member is adapted to be forced, in a direction along its said longitudinal axis, the dimensions of said opening being such that said deforming means interfere with the passage of said fins through said space whereby a deformation of said fins results.

2. The energy-absorbing device of claim 1, wherein said elongate member has a circular cross section.

3. The energy-absorbing device of claim 2, wherein said elongate member and said deforming means comprises a plurality of arcuate members.

4. The energy-absorbing device of claim 1, wherein each of said laterally extending fins comprises one leg of an L-shaped member, the other leg of said L-shaped member being secured to said elongate member.

5. An energy-absorbing device comprising: an elongate member having a circular cross section, a plurality of fins extending radially from said elongate member, said fins lying parallel to the axis of said elongate member and being spaced equidistant about the periphery of said elongate member, plural fin-deforming means positioned adjacent said elongate member, said fin-deforming means being spaced such that each one of said fins will be engaged and deformed by one of said fin-deforming means upon movement of said elongate member along its longitudinal axis.

6. The energy-abosrbing device of claim 5, wherein said fin-deforming means comprise elongate deforming members having circular cross sections, the longitudinal axis of each of said deforming members lying perpendicular to the direction in which the fin engaged by each of said deforming members extends from said elongate member.

7. The energy-absorbing device of claim 5, each of said fins comprising one leg of an L-shaped member, the other leg of said L-shaped member being positioned on the surface of said elongate member and being secured thereto.

8. An energy-absorbing device comprising:
a stationary member, a movable member, a deformable fin secured to one of said members and extending in a direction along the length of said one member, a fin-deforming means secured to the other of said members, said deformable fin and said fin-deforming means being so dimensioned with respect to one another when secured to their associated members that said deforming means continuously interferes with the passage of the lateral extent of said fin therepast when said movable member is moved with respect to said stationary member.

9. The energy-absorbing device of claim 8 wherein said deformable fin is secured to said stationary member and wherein said fin-deforming means is formed on said movable member.

10. The energy-absorbing device of claim 9 wherein: said stationary member is in the form of an enclosed housing of generally rectangular cross section, wherein said deformable fin extends from one surface into the interior of said housing and extends over a major portion of the length of said housing, wherein said movable member extends within the interior of said housing to a free end thereof, and wherein said fin-deforming means is a raised projection formed on said free end of said movable member and extending toward said interior surface of said housing.

11. The energy-absorbing device of claim 8 wherein: at least a pair of said deformable fins are employed, wherein said fins are secured to said stationary member, and wherein said fin-deforming means is secured to said movable member.

12. The energy-absorbing device of claim 11 wherein: said stationary member is in the form of an enclosed housing of generally circular cross section, wherein said deformable fins extend into the interior of said housing at generally equally spaced positions about the circumference thereof, wherein said movable member extends within the interior of said housing to a free end thereof, and wherein said fin-deforming means has a generally tapered surface formed on said free end of said movable member which tapered surface extends to a final dimension larger than the opening provided between said fins extending into the interior of said housing.

13. The energy-absorbing device of claim 12 wherein: said tapered surface is a spherical surface having a diameter larger than the opening provided between said fins.

* * * * *